United States Patent
Petrmichl et al.

(10) Patent No.: US 9,416,581 B2
(45) Date of Patent: Aug. 16, 2016

(54) VACUUM INSULATED GLASS (VIG) WINDOW UNIT INCLUDING HYBRID GETTER AND MAKING SAME

(75) Inventors: Rudolph H. Petrmichl, Ann Arbor, MI (US); John P. Hogan, Dearborn, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1044 days.

(21) Appl. No.: 13/562,423

(22) Filed: Jul. 31, 2012

(65) Prior Publication Data
US 2014/0037870 A1    Feb. 6, 2014

(51) Int. Cl.
*E06B 3/66* (2006.01)
*E06B 3/677* (2006.01)

(52) U.S. Cl.
CPC ............ *E06B 3/6612* (2013.01); *E06B 3/6775* (2013.01); *Y02B 80/24* (2013.01)

(58) Field of Classification Search
CPC ...... E06B 3/6612; Y02B 80/20; Y02B 80/22; Y02B 80/24
See application file for complete search history.

(56) References Cited

U.S. PATENT DOCUMENTS

| | | | |
|---|---|---|---|
| 4,430,537 A | 2/1984 | Sauer et al. | |
| 6,422,824 B1 * | 7/2002 | Lee | F04B 37/02 313/553 |
| 6,514,430 B1 | 2/2003 | Corazza et al. | |
| 6,558,494 B1 | 5/2003 | Wang et al. | |
| 6,692,600 B2 | 2/2004 | Veerasamy | |
| 7,115,308 B2 | 10/2006 | Amari et al. | |
| 8,137,494 B2 | 3/2012 | Cooper et al. | |
| 8,227,055 B2 | 7/2012 | Wang | |
| 2003/0001499 A1 | 1/2003 | Kim | |
| 2003/0051436 A1 | 3/2003 | Veerasamy et al. | |
| 2004/0104675 A1 | 6/2004 | Martelli et al. | |
| 2004/0253395 A1 | 12/2004 | Amari et al. | |
| 2005/0243451 A1 | 11/2005 | Wu et al. | |
| 2011/0234091 A1 | 9/2011 | Yoshitake et al. | |

FOREIGN PATENT DOCUMENTS

| | | |
|---|---|---|
| EP | 0 757 920 | 2/1997 |
| EP | 1 439 152 | 7/2004 |
| JP | 7 140906 | 6/1995 |
| JP | 2004-149343 | 5/2004 |
| JP | 2004-152530 | * 5/2004 |
| WO | WO 97/29503 | 8/1997 |
| WO | WO 01/12942 | 2/2001 |
| WO | WO 2004/039741 | 5/2004 |
| WO | WO 2004/039742 | 5/2004 |

OTHER PUBLICATIONS

U.S. Appl. No. 13/562,386, filed Jul. 31, 2012; Petrmichl et al.
U.S. Appl. No. 13/562,408, filed Jul. 31, 2012; Petrmichl et al.

* cited by examiner

*Primary Examiner* — Donald J Loney
(74) *Attorney, Agent, or Firm* — Nixon & Vanderhye P.C.

(57) ABSTRACT

This relates to vacuum insulated glass (VIG) window units and methods for making VIG window units. Hybrid getter(s) are utilized. In certain example embodiments, a hybrid getter for use in a VIG window unit and/or a method making same includes both evaporable getter (EG) material and non-evaporable getter (NEG) material. In certain example embodiments, the NEG material may be covered (directly or indirectly) with EG material in the hybrid getter at least prior to getter activating/flashing.

14 Claims, 4 Drawing Sheets

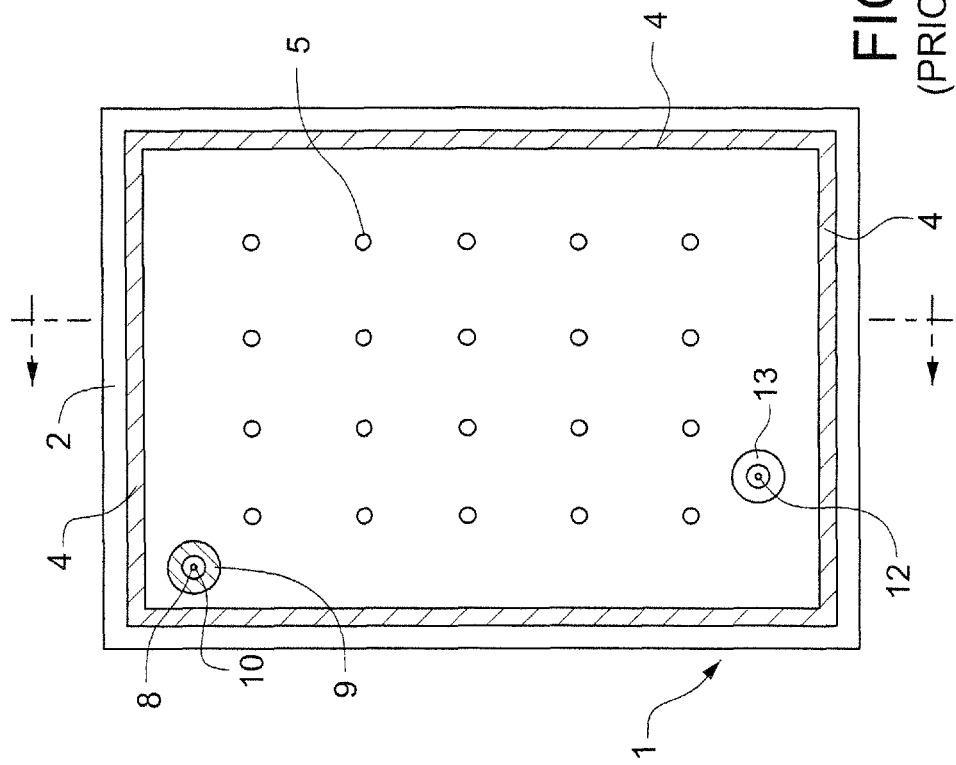

VACUUM INSULATED GLASS (VIG) WINDOW UNIT INCLUDING HYBRID GETTER AND MAKING SAME

This disclosure relates generally to vacuum insulated glass (VIG) window units and methods for making VIG window units. The disclosure more particularly relates to VIG window units including at least one hybrid getter, and methods of making the same. In certain example embodiments of this invention, a hybrid getter for use in a VIG window unit and/or a method making same includes both evaporable getter (EG) material and non-evaporable getter (NEG) material. In certain example embodiments, the NEG material may be covered (directly or indirectly) with EG material in the hybrid getter at least prior to getter activating/flashing.

BACKGROUND AND SUMMARY OF EXAMPLE EMBODIMENTS

Vacuum insulating glass (VIG) window units typically include at least two spaced apart glass substrates that enclose an evacuated low-pressure space/cavity therebetween. The substrates are interconnected by a peripheral edge seal and typically include spacers between the glass substrates to maintain spacing between the glass substrates and to avoid collapse of the glass substrates that may be caused due to the low pressure evacuated environment that exists between the substrates. Some example VIG configurations are disclosed, for example, in U.S. Pat. Nos. 5,657,607, 5,664,395, 5,657,607, 5,902,652, 6,506,472 and 6,383,580 the disclosures of which are all hereby incorporated by reference herein in their entireties.

FIGS. 1 and 2 illustrate a conventional VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2, 3 are interconnected by a peripheral edge seal 4 which may be made of fused solder glass, for example. An array of support pillars/spacers 5 may be included between the glass substrates 2, 3 to maintain the spacing of glass substrates 2, 3 of the VIG unit 1 in view of the low-pressure space/gap 6 present between the substrates 2, 3.

A pump-out tube 8 may be hermetically sealed by, for example, solder glass 9 to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate (e.g., pump-down) the interior cavity 6 to a low pressure that is less than atmospheric pressure. After evacuation of the cavity 6, a portion (e.g., the tip) of the tube 8 is melted to seal the vacuum in low pressure cavity/space 6. The optional recess 11 may retain the sealed pump-out tube 8.

As shown in FIGS. 1-2, a getter 12 may be included within a recess 13 that is disposed in an interior face of one of the glass substrates, e.g., glass substrate 2. The getter 12 may be used to absorb and/or bind with certain residual impurities that may remain after the cavity 6 is evacuated and sealed. The getter is of or includes a mixture of metals that can react with gas(es) to hold gas(es) impurities to the gettering surface and/or dissolve such gas(es).

Disclosed herein are techniques for providing improved getters for use in VIG window units and/or methods of making VIG window units. This disclosure relates to the use of at least one hybrid getter in a VIG window unit and/or method of making such a VIG window unit. Getters are typically subdivided into two main classes: an evaporable getters (EG) and a non-evaporable getters (NEG). NEG type getters tend to have lower activation temperature(s) than do EG type getters. In certain example embodiments of this invention, a hybrid getter for use in a VIG window unit and/or a method making same includes both EG and NEG material. In certain example embodiments, the NEG material may be covered (directly or indirectly) with EG material in the hybrid getter at least prior to getter activation/flashing.

In certain example embodiments of this invention, there is provided a method of making a vacuum insulated glass (VIG) window unit, the method comprising: having first and second substantially parallel substrates (e.g., substrates of or including glass), a plurality of spacers and a seal provided between the first and second substrates, and a cavity to be evacuated to a pressure less than atmospheric pressure located between the substrates, and a hybrid getter supported by the first substrate; the hyrid getter comprising non-evaporative getter (NEG) material and evaporative getter (EG) material, the EG material at least partially covering the NEG material; and activating the hybrid getter.

In certain example embodiments of this invention, there is provided a vacuum insulated glass (VIG) window unit comprising: first and second substantially parallel substrates, a plurality of spacers and a seal provided between the first and second substrates, a cavity, at a pressure less than atmospheric pressure, located between the first and second substrates; wherein non-evaporative getter (NEG) material is located on (directly or indirectly) the first substrate, and wherein evaporated and deposited getter material, from evaporable getter (EG) material, is located on (directly or indirectly) the second substrate at least in an area substantially opposite the location of the NEG material.

These and other embodiments and advantages are described herein with respect to certain example embodiments and with reference to the following drawings in which like reference numerals refer to like elements throughout the several views, and wherein:

BRIEF DESCRIPTION OF THE DRAWINGS

FIG. 1 is a cross sectional schematic diagram of a conventional VIG unit;

FIG. 2 is a top plan view of the conventional VIG unit of FIG. 1;

DETAILED DESCRIPTION OF EXAMPLE EMBODIMENTS

Figure 3:
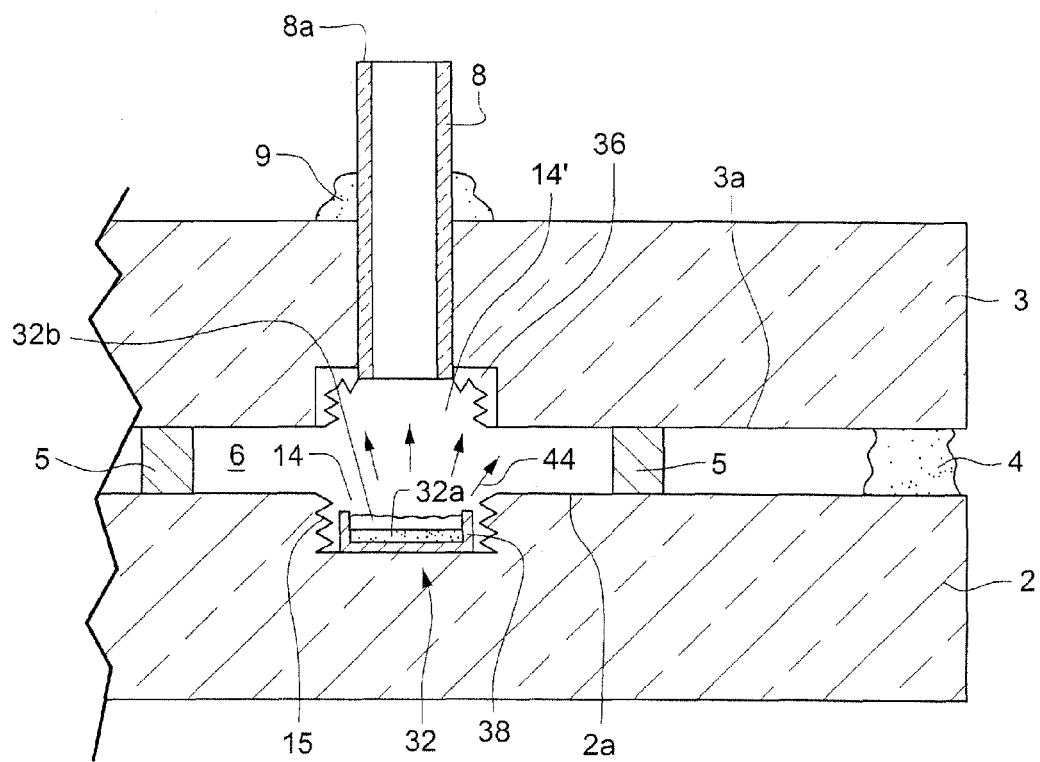
FIG. 3 is a schematic partial cross sectional diagram illustrating an example VIG window unit, prior to flashing/activating the EG material of the hybrid getter, according to an example embodiment of this invention.

Certain example embodiments will be described in detail herein with reference to the foregoing drawings in which like reference numerals refer to like elements throughout the several views. It will be understood that the embodiments described herein are intended to be illustrative, not limiting, and that those skilled in the art will understand that various modifications may be made without departing from the true spirit and full scope of the claims appended hereto.

In a technique for making a vacuum insulated glass (VIG) window unit, there is provided first and second substantially parallel glass substrates 2 and 3, a plurality of spacers 5 and a seal (e.g., edge seal) 4 provided between the first and second substrates, and a cavity 6 to be evacuated to a pressure less than atmospheric pressure located between the glass substrates 2 and 3. A hybrid getter 32 is supported by substrate 2, the hyrid getter including non-evaporative getter (NEG) material 32a and evaporative getter (EG) material 32b. In certain example embodiments, the EG material 32b at least partially covers the NEG material 32a of the hybrid getter. In certain example embodiments, the NEG material 32a and EG material 32b are provided in a container 38 (e.g., metallic or substantially metallic container, adapted for heating via a coil which may be used in activating the getter) supported by glass substrate 2, with the EG material 32b partially or fully covering the NEG material 32a in the container 38 so that the NEG material 32a is located between the EG material 32b and a base 38a of the container 38. At least prior to activating/flashing, the hybrid getter 32 may be located in a recess 14 defined in substrate 2. After seal material (e.g., frit) has been heated in order to form the edge seal 4, and during and/or after the evacuation process for evacuating cavity 6, the hybrid getter 32 is sufficiently heated so that it is activated/flashed. Prior to activating, the entire getter 32 is supported by substrate 2, and then activating/flashing of the hybrid getter causes at least some EG material 32b of the hybrid getter to evaporate and line-of-site deposit on at least a surface of the opposite substrate 3 (e.g., on an interior major surface of substrate 3, and/or in an optional recess 14' which may be defined in substrate 3). Activating of the hybrid getter 32 is preferably performed by heating the hybrid getter 32 via a laser beam and/or via radiation from a coil (e.g., directing a laser beam through a pump-out tube 8 to activate the hybrid getter and/or directing radiation at the getter from a coil located outside the VIG unit). Activating is preferably performed during and/or after an evacuation process in which the cavity 6 is evacuated to a pressure less than atmospheric pressure. In certain example embodiments, activating of the getter 32 is performed after during and/or after the evacuation process in which the cavity 6 is evacuated, so that said activating is performed at least after pressure in the cavity 6 drops to or below about $1 \times 10^{-2}$ to $1 \times 10^{-3}$ mbar. NEG material is advantageous in that in certain instances residual gas(es) in the cavity/space 6 are better attracted to NEG material compared to EG material.

Figure 4:
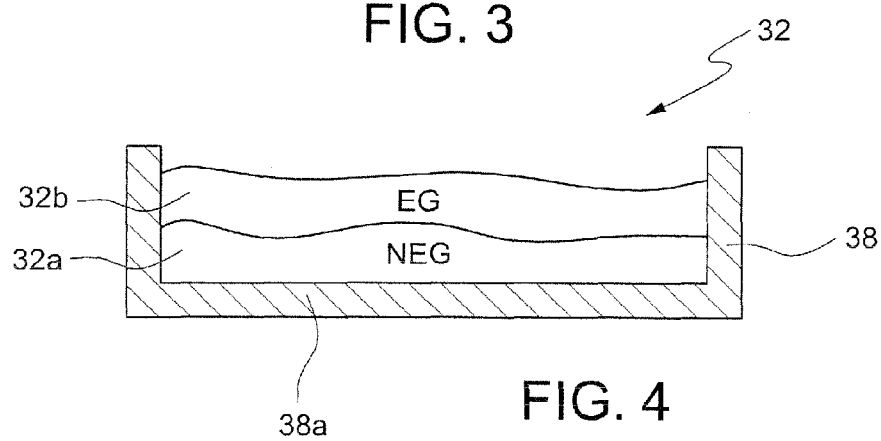
FIG. 4 is a cross sectional view of an example hybrid getter, prior to flashing/activation of the EG material, that may be used in the VIG window unit of FIG. 3 according to an example embodiment of this invention.
Figure 5:
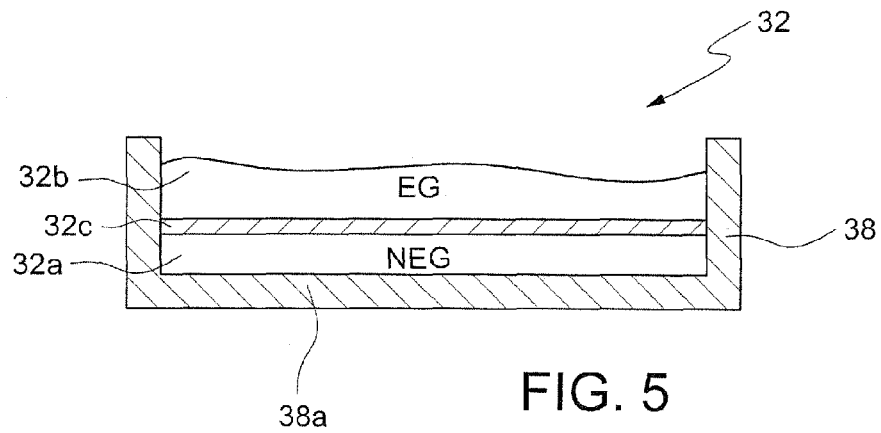
FIG. 5 is a cross sectional view of another example hybrid getter, prior to flashing/activation of the EG material, that may be used in the VIG window unit of FIG. 3 according to an example embodiment of this invention.

Getter 32 absorbs and/or binds with certain residual impurities (e.g., undesirable gases such as $CO_2$ and $N_2$) that may remain and/or are present in the cavity 6 during and/or after evacuation. For purposes of simplicity, the getter is shown in non-activated form in FIGS. 3-5. Getters are typically subdivided into two main classes: evaporable getters (EGs) and non-evaporable getters (NEGs). EGs often include one or more alkaline earth metal(s) calcium, strontium, and/or especially barium. NEGs often include titanium, zirconium, or alloys thereof with one or more metals selected amongst aluminum and metal(s) of the first transition row. Both getter types, EGs and NEGs, require activation by heating for their operation to remove from the getter surface various oxides, carbides, and/or nitrides that otherwise inhibit the gaseous species to be removed from being sorbed on the getter's surface. Getters are typically made and transported in inactive form and require a suitable activating/flashing heat treatment once they are arranged in the space to be evacuated.

In certain example embodiments, prior to activating, the hybrid getter 32 may also include a protective film 32c located between the NEG material 32a and the EG material 32b. The protective film 32c may be substantially metallic, and may be of or include aluminum, nickel, or a mixture thereof. The protective film 32c may be a single layer film, or alternatively may include first and second layers respectively comprising first (e.g., Al) and second (e.g., Ni) metals. Activating of the getter preferably causes the protective film 32c to decompose, become significantly porous, and/or disintegrate.

With reference in particular to FIG. 3, a schematic cross sectional view of an example VIG window unit 1 is illustrated. VIG window units 1 may be used, for example, and without limitation, as windows in residential homes, office buildings, apartment buildings, doors, and/or the like. The VIG window unit 1 includes spaced apart first and second transparent and substantially parallel glass substrates 2, 3 that may be interconnected by an edge seal 4, which may, for example, and without limitation, be of or include a vanadium based or VBZ type seal or a solder glass type seal. Example vanadium based or VBZ type seal compositions are disclosed in U.S. patent application Ser. No. 13/354,963, filed Jan. 20, 2012, the disclosure of which is incorporated by reference herein in its entirety. VBZ (e.g., vanadium, barium, zinc) based seal compositions are discussed in Ser. No. 13/354,963, and may be used for the edge seal 4 and/or frit based tube seal 9 in certain example embodiments. Conventional solder glass frit material may also be used for the hermetic edge seal 4 and/or the frit based tube seal 9 in certain example embodiments. When using VBZ type seal frit compositions, a lower temperature sealing thermal profile is used to maintain the desired temper of the glass of the VIG unit because VBZ compositions have a lower firing temperature (e.g., <250° C.) than certain other conventional glass frit compositions that may be used to form seals in VIG units. It will be understood that the embodiments disclosed herein are equally applicable to VIG configurations using any suitable seal material.

In certain embodiments, the transparent glass substrates 2, 3 may be approximately the same size. However, in certain other example embodiments, one glass substrate 2 may be larger than the other 3 to provide, for example, an approximately L-shaped step proximate an edge of the VIG unit. One or both of the glass substrates 2, 3 may also optionally include at least one coating material (not shown) such as, for example, and without limitation, a low-E coating (not shown). It will be understood that various coatings may be present on an interior surface of at least one of the glass substrates 2, 3, and that such coatings provide various beneficial performance characteristics to the VIG window unit 1. In certain example embodiments, a low-E coating for blocking IR radiation is provided at the interior surface 3a of substrate 2 and/or 3. In certain example embodiments, the VIG window unit has a visible transmission of at least about 30%, more preferably of at least about 40%, even more preferably of at least about 50%, and even more preferably of at least about 60% or 70%.

An array of support pillars/spacers 5 is located between the glass substrates 2, 3 to maintain the spacing of the substrates in view of the lower than atmospheric pressure that is ultimately provided in low pressure evacuated cavity/space 6 between the substrates 2, 3. In certain example embodiments, the spacers 5 may have a height, for example, of about 0.1 to 1.0 mm, more preferably from about 0.2 to 0.4 mm. The height of the spacers 5 may approximately define the height of the vacuum/evacuated cavity 6. As noted above, the spacers 5 are preferably of a size that is sufficiently small so as to be visibly unobtrusive. According to certain example embodiments, the spacers 5 may be made of or include solder glass, glass, ceramic, metal, polymer, or any other suitable material. Additionally, the spacers 5 may be, for example, generally cylindrical, round, spherical, dime-shaped, C-shaped, pillow-shaped or any other suitable shape.

A pump-out tube 8, that may be hermetically sealed for example using solder glass 9, is provided through a hole 22 in one of the glass substrates, e.g., substrate 3. The pump-out tube 8 is used in a process to evacuate the cavity 6 between the substrates 2, 3, such as, for example, by attaching a vacuum pump (directly or indirectly) to the distal end of pump-out tube 8 and evacuating the cavity 6 to a low pressure, e.g., a pressure lower than atmospheric pressure. Alternatively, the cavity 6 may be evacuated in a low-pressure chamber. In a preferred example, a pressure in the cavity 6 following evacuation is, for example, preferably below about $10^{-2}$ Torr, and more preferably below about $10^{-3}$ Torr, and even more preferably below about $5 \times 10^{-4}$ Torr. During the evacuation process, the VIG unit may be subject to heating to help with the evacuating process, e.g., temperature(s) from about 150-300 degrees C. After evacuating the cavity 6, the pump-out tube 8 may be sealed, for example, by melting the tip 8a of the tube 8 by any suitable means, such as, for example, by laser. According to certain example embodiments, the pump-out tube 8 may or may not fully extend through the hole 22 to be flush with the interior surface 3a of the glass substrate 3, and may be left just short of the interior surface 3a by a distance of, for example, and without limitation, up to about up to 0.1 mm from the interior surface 3a in certain example embodiments.

In making the VIG window unit, after the pillars/spacers 5 are positioned on bottom glass substrate 2, at least one hybrid getter 32 is positioned in a getter recess 14. Then, the edge seal material is deposited on substrate 2. The other substrate 3 is brought down on substrate 2 so as to sandwich spacers/pillars 5, the glass frit solution for the seal, and getter(s) 32 between the two substrates 2, 3. The assembly including the glass substrates 2, 3, the spacers/pillars 5, getter 32, and the edge seal material is then heated to a temperature (e.g., about 350-500° C.) at which point the edge seal material melts, wets the surfaces of the glass substrates 2, 3, and ultimately forms a hermetic peripheral/edge seal 4. After formation of the edge seal 4 between the substrates 2, 3, a vacuum is drawn via the pump-out tube 8 to form low pressure space/cavity 6 between the substrates 2, 3. To maintain the low pressure in the space/cavity 6, substrates 2, 3 are hermetically sealed via edge seal 4, and the small spacers/pillars 5 are provided between the substrates to maintain separation of the approximately parallel substrates against atmospheric pressure. Once the cavity/space 6 between substrates 2, 3 is evacuated, the pump-out tube 8 may be sealed, for example, by melting its tip using a laser or the like. After evacuation of the cavity/space 6 to a pressure less than atmospheric, sealing of the pump-out tube may be accomplished by heating an end 8a of the pump-out tube 8 to melt the opening and thus seal the cavity of the VIG window unit. For example and without limitation, this heating and melting may be accomplished by laser irradiation of the tip 8a of the pump-out tube 8.

There are limitations to using either solely an EG getter or solely using an NEG getter in VIG applications. EG type getters are activated by heating to such temperatures that the getter component (e.g., Ba) evaporates and is line-of-sight deposited onto an adjacent surface(s). It is the surface of the deposit that is an active getter. Thus, sorption capacity of EG getters is largely determined by the area of the coated surface that is created after activating/flashing. The diminutive vacuum gap/cavity 6 in VIG applications severely limits the coating area for EG type getters that can be created by evaporation. In the active of an active NEG type getter, surface absorption is followed by diffusion into the getter bulk, thus its sorption capacity depends on both the total mass of getter material and temperature. NEG type getters typically having a lower activation temperature than do EG type getters. The issue with using solely NEG type getters in VIG window units is that the getter is exposed to atmosphere during the high temperature fabrication step for producing the hermetic edge seal 4 (e.g., to about 350-500 degrees C.), which can lead to premature activating of NEG type getters. Thus, the edge seal frit firing tends to generate a rather thick passivation layer on the NEG surface before the cavity 6 can be evacuated (e.g., pumped out). This reduces the capacity of the NEG type getter and increases the time required to subsequently activate/flash it. Using less reactive NEG material will reduce the thickness of the passivation layer that premature forms during forming/firing of the edge seal 4, but consequently the sorption speed and total capacity are reduced at low temperature. Thus, in certain example embodiments of this invention, EG type getter material and NEG type getter material are combined in a "hybrid" type getter designed for VIG applications in order to address the above-discussed problems.

In certain example embodiments (e.g., see FIGS. 3-4), the hybrid getter 32 is of or includes a container 38 (e.g., metal or substantially metallic metal trough that may be annular or cylindrical shaped and designed to be heated, such as inductively heated) which contains a first getter layer 32a of NEG material at the bottom of the container and a second getter layer 32b of EG material covering the NEG material 32a. The EG layer 32b may be of the exothermic type, such that its composition includes reagent(s) (e.g., Al and Ni, or Ti) which react and produce heat thereby reducing the amount of time required to activate/flash the getter. The EG layer 32b may be compacted in such a manner that it prevents or reduces exposure of the NEG material 32a to the atmosphere during the firing/heating of the frit for forming the edge seal 4. The EG layer 32b may optionally contain additives for improving its gas barrier properties, to further protect the NEG material 32a.

Figure 8:
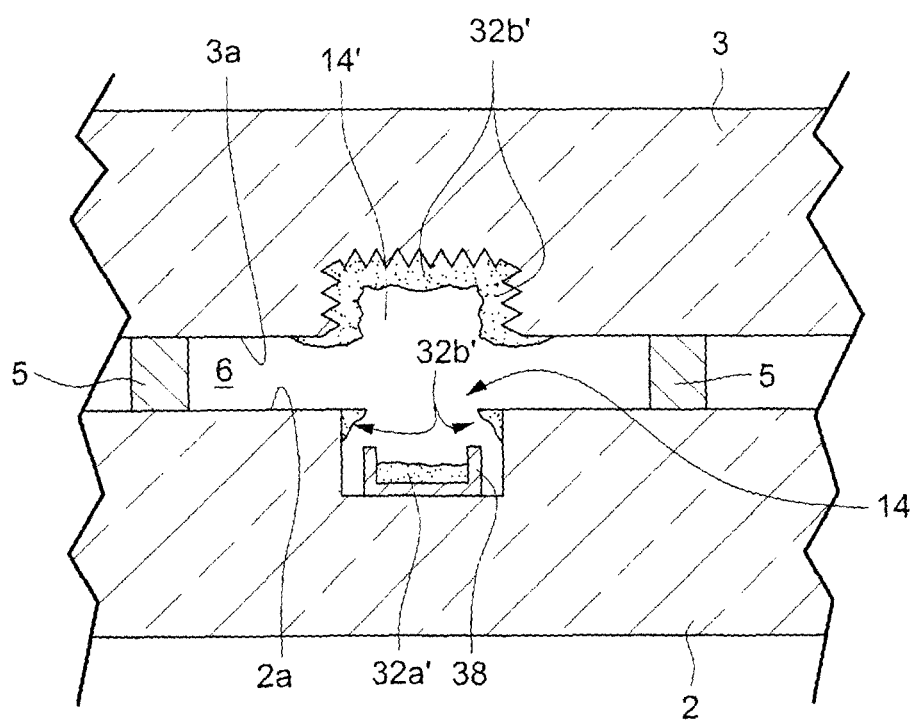
FIG. 8 is a schematic partial cross sectional diagram illustrating an example VIG window unit, after flashing/activating the hybrid getter of any of FIGS. 3-6, according to an example embodiment of this invention.

Activating/flashing may be achieved by heating (e.g., via induction heating via a coil and/or via a laser beam) the hybrid getter 32 to a temperature where the EG material 32b activates/flashes, thereby causing the getterable component(s) of the EG layer (e.g., one or more of Ba, Ca and/or Sr) to evaporate 44 and deposit as an activated layer 32b' including on the surface of opposing substrate 3 and/or on sidewall(s) 15 of the recess 14 (e.g., see FIG. 8). At essentially the same time, the underlying NEG layer 32a becomes at least partially exposed and accessible to residual gases (e.g., $CO_2$ and/or $N_2$) in cavity 6 due to the evaporation of the EG (e.g., see FIG. 8). Accordingly, the hybrid getter 32 is frittable (survives the frit firing process during edge seal 4 formation) and products two different active gettering surfaces as shown in FIG. 8, namely (i) the evaporated EG layer 32b' which may be present on both the opposing substrate 3 and portions of substrate 2 such as along sidewall(s) 15 of recess 14, and (ii) the NEG 32a' which remains in the container 38 and/or recess 14 on substrate 2. By using highly reactive NEG material as the first layer 32a, the NEG 32a' can sorb gases at temperatures including but not limited to room temperature.

FIG. 8 illustrates the VIG window unit of any of FIGS. 3-6, after activating/flashing of the getter 32. Note that the pump-out tube 8, and optional porous/rough coating 36, are not shown in FIG. 8 for purposes of simplicity—further evidencing for example that the getter recesses 14 and 14' may be located distant from the pump-out tube 8 in certain example embodiments of this invention. The sidewall(s) of recess 14 and/or recess 14' may or may not be roughened 15 according to different example embodiments. FIG. 8 illustrates that, after activating/flashing the hybrid getter, the activated NEG material 32a remains in recess 14 and/or container 38 on substrate 2. FIG. 8 further illustrates that, after activating/flashing the hybrid getter, the evaporated and deposited EG material 32b' is present on both the opposing substrate 3 proximate the original getter recess 14 and possibly on sidewall(s) of the original getter recess 14. It can be seen that in embodiments were additional recess 14' is provided on the opposing substrate 3, the EG material 32b' following activation may be deposited on surfaces of the recess 14' and/or surfaces of the major interior surface 3a of substrate 3 proximate the original getter recess 14. It is also possible that activated EG material 32b' may end up deposited on part of the major interior surface 2a of the substrate 2 proximate the original getter recess 14.

Thus, it will be appreciated that prior to said activating the hybrid getter 32 may be located in recess 14 defined in the first substrate 2 (e.g., see FIG. 3), whereas after said activating non-evaporative getter (NEG) material 32a' may be located in the recess 14 defined in the first substrate 2 and evaporated and deposited getter material 32b' from the EG material 32b may be located on the second substrate 3 at least in an area substantially opposite the recess 14 defined in the first substrate 2 (e.g., see FIG. 8).

Optionally, as shown in FIG. 3, the opposing substrate 3 may include a recess 14', and/or a rough and/or porous coating 36, which function to increase the surface area of the EG material that is deposited on substrate 3 after activation. However, in certain example embodiments, the surface of substrate 3 opposite the getter recess 14 may optionally be flat in certain example embodiments of this invention.

In various embodiments herein, the substrates 2 and/or 3 of or including glass may be from about 1-6 mm thick, more preferably from about 3-5 mm thick, with an example glass thickness being about 4 mm. In various embodiments herein, recess 14 and/or recess 14' may have a depth of from about 1.5 to 2.5 mm, with an example recess depth being about 2 mm in an example 4 mm thick sheet of glass. In certain example embodiments of forming the substrates 2 and 3, the getter recess(es) 14 and/or 14' are formed in respective glass sheets, then the glass sheets may optionally be thermally tempered, then optionally a low-E coating may be provided on an interior surface of one of the substrates, then the two substrates 2, 3 (including any low-E coating, not shown) may be brought together around edge seal material and spacers as discussed herein during the VIG formation process.

In certain example embodiments of this invention (e.g., see FIGS. 3 and 5), the hybrid getter may include an additional protective film 32c (e.g., membrane or one or more layers) located between and contacting the EG layer 32b and NEG layer 32a. The protective film 32c may be provided for preventing or reducing reactions between the EG material and NEG material prior to and/or during activation as well as improving gas barrier protection of the NEG 32a. Protective film 32c is designed to lose its integrity (e.g., become porous, vaporize, decompose, and/or disintegrate) at or below the peak temperature(s) reached during the activating/flashing of the EG layer 32b, thereby permitting the NEG layer 32a to sorb residual gases after activation of the hybrid getter. An example of a protective film 32c is a layer of or including aluminum (Al melts at 660 degrees C.), present as a vacuum depositing coating, a thin foil, or a rigid spacer such as a very thin washer. Another example protective film 32c is a layer of or including a mixture of Al and Ni. Another example protective film 32c is a layer of Al and a layer of Ni in direct contact with each other (e.g., as two metallic or substantially metallic foils in direct contact with each other). Though the Ni melting point (about 1453) is above the peak EG activating/flashing temperature (e.g., about 1300 degree C.) in certain example embodiments, the exothermic reaction between the Al and Ni foils can raise the local temperature sufficiently to substantially destroy the protective film's integrity and may facilitate getter flashing through the production of heat.

Figure 6:
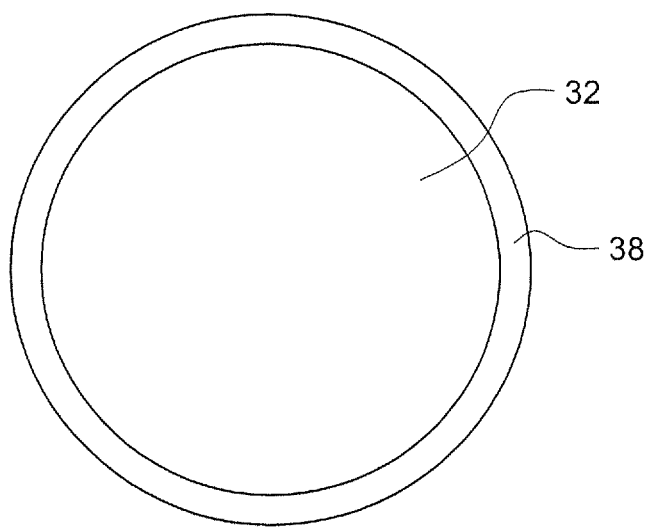
FIG. 6 is a top plan view illustrating that any of the getters of FIGS. 3-5 may be provided in a cylindrical container in certain example embodiments of this invention.
Figure 7:
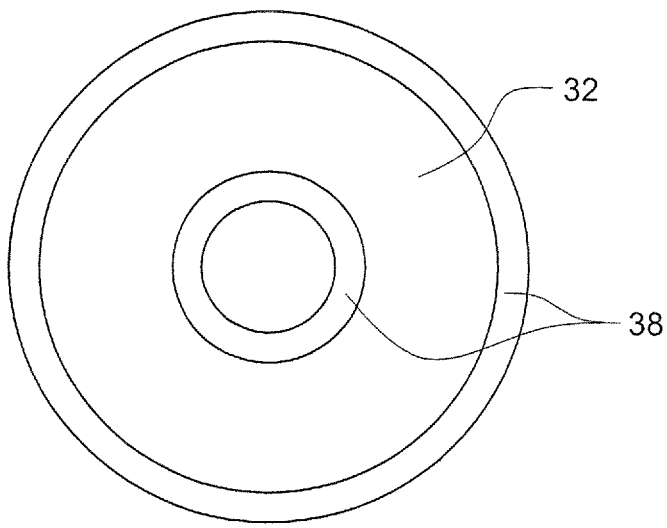
FIG. 7 is a top plan view illustrating that any of the getters of FIGS. 3-5 may be provided in an annular container in certain example embodiments of this invention.

FIGS. 6-7 illustrate that any getter 32 herein may be initially provided in either a cylindrical (FIG. 6) or annular (FIG. 7) shaped getter container 38. Other shaped containers 38 may also be used. Moreover, while the getter materials are initially provided in a container 38 in certain example embodiments, a container 38 is not needed in certain example embodiments as the getter 32 may optionally be initially directly deposited on substrate 2.

While the hybrid getter 32 may be activated via inductive heating from a coil located outside the VIG unit in certain example embodiments of this invention, an example technique for activating via a laser beam is described referring to FIG. 3. During and/or at the end of the evacuation process when the pressure of cavity/space 6 is being lowered, the VIG unit is subjected to heating to help with the evacuating process, e.g., heated to and/or in temperature(s) from about 150-300 degrees C. During and/or at the end of the cavity evacuation process, a laser beam and/or coil may be used to activate the getter. Because the VIG unit is already heated (e.g., to about 150-300 degrees C.) due to the heating used in the pump-out evacuation process, the energy and time needed to activate the getter 32 can be reduced by performing the activation during the evacuation process. Moreover, if conducted during the evacuation process, all or a portion of the time required for activation can overlap time required for evacuation (e.g., from about 3-12 minutes), thereby reducing the time needed to make the VIG window unit. By carrying out both evacuation and getter activation in overlapping manners (i.e., at least partially at the same time), throughput of an inline fabrication process of fixed length and line speed can be increased. Getter 32 can be provided below the pump-out tube 8 and at least partially in getter recess 14 in the glass substrate 2 as shown in FIG. 3, so as to enable a laser beam to heat the getter through the tube 8. The location below the pump-out tube 8 is also advantageous because it allows for more scattering of the EG getter material during activation/flashing thereby resulting in more active getter surface area. During and/or at the end of the evacuation process, a laser (e.g., YAG laser), not shown, used to seal the tip of the pump-out tube 8 can also be used to heat the getter(s) 32 in order to activate the getter(s), in particular the EG 32b which typically has a higher activation temperature than does the NEG 32a. The laser can be aimed through the bore of the pump-out tube 8 so that the laser beam emitted from the laser goes through the tube 8 and hits the getter 32 in order to further heat the getter to EG activation temperature(s). The laser beam may be directed through the pump-out tube 8 toward the getter 32 when the VIG unit is located in a vacuum chamber (not shown) so that the pressure in the cavity 6 does not significantly rise when the laser beam is being directed toward the getter for getter activation. As can be seen in the FIG. 3 embodiment, the getter 32 can be located substantially directly below the pump-out tube 8. The activating causes the EG material to evaporate and deposit 32b' in the cavity 6 as explained above. And by creating cracks in an NEG type getter (before and/or after activation of the EG), residual gas(es) in the cavity 6 gain passage to the NEG getter core or interior after evaporation of the EG so that they can be trapped and/or absorbed by the NEG. After the getter 32 has been activated/flashed by the laser beam, the same laser can be used to seal (tip-off) the top of the pump-out tube 8. In certain example embodiments, the laser beam may impinge upon the getter 32 for from about 2-15 seconds, more preferably from about 3-10 seconds, in order to activate the getter 32, and thereafter may impinge upon the tip 8a of the pump-out tube 8 for from about 20-30 seconds in order to seal off the tip of the tube thereby sealing the cavity 6. Example tip-off techniques for sealing off the top of the tube 8 via laser are described in U.S. Ser. No. 13/474,819, filed May 18, 2012, the entire disclosure of which is hereby incorporated herein by reference.

Upon heating, activation causes EG material evaporation (e.g., barium) onto the inner surfaces of the VIG unit in the cavity 6, including onto vertical, rounded or tilted sidewalls of recess 14 and/or onto the inner major surfaces of substrates 2, 3, and possibly into part of tube 8 (e.g., see FIG. 8). In certain example embodiments, the EG 32b may be of or include $BaAl_4$ and Ni, in which case exposure of the getter material to the laser and/or radiation for activation causes an increase in temperature of the powders to about 800-850 degrees C. At these temperatures, an exothermic reaction takes place between $BaAl_4$ and Ni, that causes a further rise in temperature to about 1100-1200 degrees C., at which temperature barium from the EG evaporates. The metal condenses in the form of a film 32b' on the adjacent inner surfaces of the VIG unit according to a so-called flash phenomenon, with the evaporated barium inclusive film being an active element in the gettering of undesired gases from the evacuated cavity 6. Thus, activation of the EG 32 causes the EG getter material to scatter to and become evaporated onto adjacent areas inside the VIG unit via evaporation thereby increasing the surface area of gettering material. Thus, following activation/flashing, evaporated EG getter material 32b' is provided on the vertical, rounded or tilted sidewalls of getter recess 14 and/or on the inner major surface(s) of substrates 2 and/or 3 proximate the recess 14, and possibly into part of tube 8 and/or the sidewall of the hole for the tube 8, and the NEG getter material 32a' is at least partially exposed so that it too can sorb undesirable gases form cavity 6 (e.g., see FIG. 8).

EG material 32b may be made of any suitable material that functions as an evaporable getter. Such materials include, but are not limited to, compounds comprising an element(s) chosen from among calcium, strontium, and barium. Preferably such compounds are in the form to limit the reactivity of these elements to air. An example useful EU material is an intermetallic compound $BaAl_4$, which further may be admixed with nickel powder and possibly small quantities of one or more of Al, Fe, Ti and/or their alloys. Other EG materials will be familiar to those of skill in the art. Meanwhile, non-evaporable getter (NEG) material 32a can be any material known to those of skill in the art to function as a non-evaporable getter. For example, such NEG materials can include alloys comprising zirconium (Zr), titanium (Ti), or mixtures thereof, and at least one other element chosen from among vanadium (V), chromium (Cr), manganese (Mn), iron (Fe), cobalt (Co), nickel (Ni), aluminum (Al), niobium (Nb), tantalum (Ta), and tungsten (W). In certain example embodiments, zirconium-based alloys may be used, such as the binary alloys Zr—Al, Zr—Fe, Zr—Ni, Zr—Co, or the ternary alloys Zr—V—Fe and Zr—Mn—Fe. For example, NEG materials such as those commercially sold by SAES Getters, based in Italy, under tradenames St 101 and St 707. Another example NEG getter material 32a has a percentage weight composition of substantially Zr 76.6%-Fe 23.4%, or Zr 75.7%-Ni 24.3%.

In certain example embodiments of this invention, there is provided a method of making a vacuum insulated glass (VIG) window unit, the method comprising: having first and second substantially parallel substrates (e.g., substrates which may comprise glass), a plurality of spacers and a seal provided between the first and second substrates, and a cavity to be evacuated to a pressure less than atmospheric pressure located between the substrates, and a hybrid getter supported by the first substrate; the hyrid getter comprising non-evaporative getter (NEG) material and evaporative getter (EG) material, the EG material at least partially covering the NEG material; and activating the hybrid getter.

In the method of the immediately preceding paragraph, the NEG material and EG material may be provided in a container supported by the first substrate, and the EG material may cover the NEG material in the container so that the NEG material is located between the EG material and a base of the container. The container may be located in a recess defined in the first substrate.

In the method of any of the immediately preceding two paragraphs, at least prior to said activating, the hybrid getter may be located in a recess defined in the first substrate.

In the method of any of the immediately preceding three paragraphs, prior to said activating, the hybrid getter may further comprise a protective film located between the NEG material and the EG material. The protective film may be metallic or substantially metallic, and may contain one or more layers. For example, the protective film may comprise aluminum and/or nickel. In certain embodiments, the protective film may comprise first and second layers of or including respective first and second metals, with example first and second metals being Al and Ni respectively.

In the method of any of the immediately preceding four paragraphs, prior to said activating, the getter may be supported by the first substrate and said activating may cause at least some EG material of the hybrid getter to evaporate and deposit on at least a surface of the second substrate.

In the method of any of the immediately preceding five paragraphs, said activating may be performed by heating the hybrid getter via a laser beam and/or via radiation from a coil.

In the method of any of the immediately preceding six paragraphs, said activating may comprise directing a laser beam through a pump-out tube to activate the hybrid getter.

In the method of any of the immediately preceding seven paragraphs, said activating may be performed during and/or after an evacuation process in which the cavity is evacuated to a pressure less than atmospheric pressure.

In the method of any of the immediately preceding eight paragraphs, said activating may be performed during and/or after an evacuation process in which the cavity is evacuated so that said activating is performed at least after pressure in the cavity drops to or below about $1 \times 10^{-2}$ to $1 \times 10^{-3}$ mbar.

In the method of any of the immediately preceding nine paragraphs, the EG material may comprise one or more of Ba, Ca and Sr.

In the method of any of the immediately preceding ten paragraphs, the NEG material may comprise zirconium (Zr).

In the method of any of the immediately preceding eleven paragraphs, wherein the substrates may comprise glass, and before and/or after said activating the VIG window unit may have a visible transmission of at least about 50%.

In the method of any of the immediately preceding twelve paragraphs, (i) prior to said activating the hybrid getter may be located in a recess defined in the first substrate, and (ii) after said activating non-evaporative getter (NEG) material may he located in the recess defined in the first substrate and evaporated and deposited getter material from the EG material may be located on the second substrate at least in an area substantially opposite the recess defined in the first substrate.

In certain example embodiments of this invention, there is provided a vacuum insulated glass (VIG) window unit comprising: first and second substantially parallel substrates, a plurality of spacers and a seal provided between the first and second substrates, a cavity, at a pressure less than atmospheric pressure, located between the first and second substrates; wherein non-evaporative getter (NEG) material is located on the first substrate, and wherein evaporated and deposited getter material, from evaporable getter (EG) material, is located on the second substrate at least in an area substantially opposite the location of the NEG material.

In the VIG window unit of the immediately preceding paragraph, the NEG material may be in a container on the first substrate.

In the VIG window unit of any of the immediately preceding two paragraphs, the NEG material may be in a first recess that is defined in the first substrate, and the evaporated and deposited getter material from evaporable getter (EU) material may be at least partially in a second recess that is defined in the second substrate.

In the VIG window unit of any of the immediately preceding three paragraphs, the NEG material may be in a first recess that is defined in the first substrate, and the evaporated and deposited getter material from evaporable getter (EG) material may also located on at least one sidewall of the first recess so that the evaporated and deposited getter material from EG material is located on both the first and second substrates.

In the VIG window unit of any of the immediately preceding four paragraphs, the evaporated and deposited getter material from evaporable getter (EG) material may comprise barium, and/or the NEG material may comprise Zr and/or Ti.

In the VIG window unit of any of the immediately preceding five paragraphs, the VIG window unit may have a visible transmission of at least about 50%.

In the VIG window unit of any of the immediately preceding six paragraphs, the first and second substrates may comprise glass that is thermally tempered.

In the VIG window unit of any of the immediately preceding seven paragraphs, the NEG material may be in a first recess that is defined in the first substrate, the first recess having a depth of from about 1.5 to 2.5 mm.

In the VIG window unit of any of the immediately preceding eight paragraphs, the evaporated and deposited getter material from evaporable getter (EG) material may be at least partially in a second recess that is defined in the second substrate, the second recess having a depth of from about 1.5 to 2.5 mm.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A vacuum insulated glass (VIG) window unit, comprising:
   first and second substantially parallel substrates,
   a plurality of spacers and a seal provided between the first and second substrates,
   a cavity, at a pressure less than atmospheric pressure, located between the first and second substrates;
   a container, supported by the first substrate, for holding both non-evaporative getter (NEG) and evaporable getter (EG) material in an overlapping manner, the VIG window unit configured so that after activation of the NEG and EG materials non-evaporative getter (NEG) material is located in the container on the first substrate, and evaporated and deposited getter material from evaporable getter (EG) material is located on the first substrate and also on the second substrate at least in an area substantially opposite the location of the NEG material.

2. The vacuum insulated glass (VIG) window unit of claim 1, wherein after activation the NEG material is in a first recess that is defined in the first substrate, and the evaporated and deposited getter material from evaporable getter (EG) material is at least partially in a second recess that is defined in the second substrate.

3. The vacuum insulated glass (VIG) window unit of claim 1, wherein after activation the NEG material is in a first recess defined in the first substrate, and the evaporated and deposited getter material from EG material is also located on at least one sidewall of the first recess so that the evaporated and deposited getter material from EG material is located on both the first and second substrates.

4. The vacuum insulated glass (VIG) window unit of claim 1, wherein the evaporated and deposited getter material from EG material comprises barium.

5. The vacuum insulated glass (VIG) window unit of claim 1, wherein the NEG material comprises Zr and/or Ti.

6. The vacuum insulated glass (VIG) window unit of claim 1, wherein the first and second substrates each comprise glass.

7. The vacuum insulated glass (VIG) window unit of claim 1, wherein the VIG window unit has a visible transmission of at least about 50%.

8. The vacuum insulated glass (VIG) window unit of claim 1, wherein the first and second substrates comprise glass that is thermally tempered.

9. The vacuum insulated glass (VIG) window unit of claim 1, wherein the NEG material is in a first recess that is defined in the first substrate, the first recess having a depth of from about 1.5 to 2.5mm.

10. The vacuum insulated glass (VIG) window unit of claim 1, wherein the evaporated and deposited getter material from evaporable getter (EG) material is at least partially in a second recess that is defined in the second substrate, the second recess having a depth of from about 1.5 to 2.5 mm.

11. A vacuum insulated glass (VIG) window unit, comprising:
    first and second substantially parallel glass substrates,
    a plurality of spacers and a seal provided between the first and second glass substrates,
    a cavity, at a pressure less than atmospheric pressure, located between the first and second substrates; and
    a hybrid getter supported by the first substrate, the hyrid getter comprising non-evaporative getter (NEG) material and evaporative getter (EG) material, the EG material at least partially overlapping the NEG material in a container.

12. The vacuum insulated glass (VIG) window unit of claim 11, wherein the container is supported by the first substrate, and wherein the EG material covers at least part of the NEG material in the container so that the NEG material is located between the EG material and a base of the container.

13. The vacuum insulated glass (VIG) window unit of claim 12, wherein the container is located in a recess defined in the first substrate.

14. The The vacuum insulated glass (VIG) window unit of claim 11, wherein after activation of the getter the non-evaporative getter (NEG) material is located in a recess defined in the first substrate and evaporated and deposited getter material from the EG material is located at least on the second substrate at least in an area substantially opposite the recess.

* * * * *